Patented Feb. 3, 1953

2,627,458

UNITED STATES PATENT OFFICE 2,627,458

PRODUCTION OF ALUMINUM-SILICON ALLOYS

Lyall J. Lichty, Ottawa, Ontario, Canada, assignor to Quebec Metallurgical Industries Limited, Toronto, Ontario, Canada, a corporation of Canada No Drawing. Application May 31, 1950, Serial No. 165,363. In Canada May 26, 1950

4 Claims. (Cl. 75—10)

This invention relates to a method for the manufacture of alloys of aluminum and silicon by reducing naturally occurring materials which are essentially oxides of silicon and aluminum, such as clay, with carbon in an electric furnace.

It has long been known that aluminum-silicon alloys may be produced by heating clay or mixtures of clay with such materials as bauxite or silica pebble or sand with sufficient carbon as reducing agent in the form of coke or charcoal to reduce the charge to an alloy of aluminum and silicon containing small amounts of other metallic constituents which may be present as impurities.

The process is usually carried out in an electric furnace because of the high temperature required for reduction. Heat is produced by the resistance of the charge to the flow of current and by arcing. When the required temperature is reached, reduction begins and the reduced metals collect in a pool in the bottom of the furnace.

Aluminum-silicon alloys are useful as reducing agents in the deoxidation of steel. They have been found to be useful as a reducing agent in the production of magnesium from dolomite.

Production of aluminm-silicon alloys is in many respects similar to production of ferroalloys, such as ferrosilicon. The same types of furnaces are used and most of the operating conditions are similar. One of the differences has been in the amount of electrode carbon consumed in the reduction. For example, in ferrosilicon manufacture, carbon electrode consumption ranges from 110 to 130 pounds per ton of product when a charge contains approximately the amount of carbon stoichiometrically required to reduce the metal oxides in the charge to their corresponding metals with the formation of an equivalent amount of carbon monoxide. In contrast, as pointed out in the United States Patent No. 2,488,568, operation of an aluminum-silicon process in an electric furnace with a charge containing coke in corresponding proportions will result in a carbon electrode consumption of more than 500 pounds per ton of alloy. And, in addition, conditions will develop in the furnace which cause a shut-down in a short time. This high electrode carbon consumption and difficulty in getting continuous furnace operation have been the main disadvantages in the manufacture of aluminum-silicon alloys.

The above mentioned United States patent describes a modification of the electric furnace process for producing aluminum-silicon alloys which reduces the electrode carbon consumption. That patent describes the reduction of a clay having a composition of about 44.5 per cent alumina, 50.7 per cent silica, 0.9 per cent ferric oxide and 2.8 per cent titanium dioxide. The reduction is effected at a temperature of the order of 2000° C. while, preferably, maintaining the electrode periphery resistance in the range from 0.30 to 0.36 ohm-inch. The electrode carbon consumption may be reduced to the order of 274–285 pounds per ton of alloy produced by using a mixture of the clay with coke as the reducing agent in an amount of about 70 to 75 per cent of the amount theoretically required for reducing the total oxides present to the metallic state. The patent states that the electrode consumption drops off sharply with decrease in the proportion of reducing agent from about 85 per cent until a minimum is reached in the neighborhood of 70 to 75 per cent of the theoretical amount required.

The present invention is based upon the surprising discovery that in reducing a charge which is essentially silica and alumina with carbon in an electric furnace, the electrode carbon consumption can be greatly reduced if the charge being smelted contains a substantial amount of iron oxide or nickel oxide or both. I presently prefer a charge containing from about 6 to 20 per cent by weight of iron oxide or nickel oxide or a mixture thereof. I have also discovered that the electrode carbon consumption can be still further reduced if the alumina content of the charge does not exceed about 25 per cent by weight. Under these conditions, I have obtained smooth furnace operation when the amount of carbon in the charge as a reducing agent is between 80 and 100 per cent or more of the theoretical amount required to reduce the total oxide content of the charge. Also, I have been able to operate the furnace at a lower temperature such that the temperature of the metal when being tapped is less than 1500° C. thus minimizing disadvantages due to excessive volatilization of alumina. Under these conditions I have maintained smooth furnace operation with an electrode carbon consumption as low as 115 pounds per ton of alloy produced.

In the practice of the present invention, the composition of the charge may be adjusted by adding and mixing with the naturally occurring silica and alumina containing material the necessary amount of iron oxide, nickel oxide or mixture thereof to bring the content thereof between about 6 to 20 per cent by weight. When desired, silica may be added and mixed with the charge to reduce the content of alumina therein to less than about 25 per cent by weight. Useful alloys of silicon, aluminum and iron or nickel may be produced by the practice of the invention by smelting a charge containing, preferably, 6 to 20% iron oxide or nickel oxide or mixture thereof, 8 to 25 per cent of aluminum oxide, 40 to 55 per cent silica and an amount of carbon between 80 to 100 per cent or more of the amount theoretically required to reduce the total amount of oxide present to metal, the remainder of the charge being impurities present in the raw materials. I presently prefer that the alumina content of the charge be not less than about 10 per cent and not more than 20 per cent.

In the course of my investigations, I was surprised to find that a charge consisting principally of graphitic shale may be smelted in accordance with the invention. Graphitic shales contain varying amounts of naturally occurring graphite which serves effectively as a reducing agent. In some instances the graphitic shale contains too large an amount of graphite for the smelting process and the composition of the charge must be adjusted by adding a suitable amount of iron oxide, aluminum oxide or silicon oxide to bring the amounts of these oxides and carbon within the ranges suitable for the practice of the invention. If the amount of graphite in the shale used is too low a suitable amount of coke or charcoal may be added.

It was surprising to discover that naturally occurring graphite serves effectively as a reducing agent in the smelting process for two reasons. Naturally occurring graphite is known to be less reactive chemically than amorphous carbon, such as coke or charcoal. For example, the Canadian Department of Mines Publication, No. 511 (1920), page 4, states "A further means of distinguishing graphite and coke or retort carbon is to note their behavior when fused with sodium sulphite. Graphite does not reduce this salt whereas coke or retort carbon react very actively with it." Although electrode carbon is sometimes referred to as graphite and is effective as a reducing agent for silica and alumina containing materials, it is produced by heating coke to a high temperature and differs essentially from naturally occurring graphite. Graphite and coke or electrode carbon are different allotropic forms of carbon.

It is also well known that the electrical conductivity of naturally occurring graphite is substantially less than that of amorphous carbon. Mellor in his treatise on inorganic and theoretical chemistry, vol. V., on page 718 states "the thermal conductivity of graphite is normal, while the electrical conductivity is abnormal. The explanation is not known." On page 719, Mellor gives the electrical conductivity of graphite as $0.082 \times 10^4$ and that of amorphous carbon as $0.25$. The naturally occurring graphite in graphitic shale is present in an extremely finely divided condition of the order of 200 mesh uniformly distributed in the shale. In this condition, particularly in view of the known low electrical conductivity of naturally occurring graphite, the graphite in the shale would not be expected to possess the electrical properties required to function effectively in a smelting process.

In one test run a 150 kw. single phase electric furnace equipped with two conventional carbon electrodes of 6 inch diameter was heated to approximately 1400° C. Over a period of 24 hours a charge of 2250 pounds containing 49.3% silica, 12.3% alumina, 12.44% ferric oxide and 21.8% fixed carbon was fed into the furnace. The fixed carbon in the charge was derived entirely from the naturally occurring graphite in the graphitic shale used and was 81.1 per cent of the amount theoretically required. Metal was tapped from the bottom of the furnace at intervals and a total of 514 pounds of metal was obtained which contained 61.1% silicon, 13.2% aluminum and 24.6% iron. The temperature of the metal issuing from the furnace was 1470 to 1490° C. Some 740 lbs. of unsmelted charge remained in the furnace. The power consumed amounted to 5.77 kilowatt hours per pound of metal produced. The electrodes were consumed at the rate of 115 pounds per ton of metal produced. The intimacy of the graphite and oxide particles in the shale appears to be of particular benefit. Metal recovery was approximately 88 per cent.

In accordance with a further aspect of the invention, I have found that the charge may be smelted in an electric furnace in which one or all the conventional electrodes are replaced by a novel electrode a substantial part of which is a graphite shale containing from about 15 to 30 per cent of naturally occurring graphite. The electrode comprises a steel tube of suitable diameter depending upon the size of the furnace. A mixture of from about 10 to 75 per cent by weight of graphitic shale with the usual prepared electrode carbon and an amount of bituminous material, such as tar or asphalt, to serve as a binder is introduced into the interior of the tube and is hardened. These electrodes may replace the upper or vertical electrodes in the conventional electric smelting furnace which comprises a steel shell having a suitable refractory lining and provided with the usual tap holes and a carbon bottom or lower electrode. If desired the lower electrode may be formed of the same composition as the interior of the upper electrodes, namely, a mixture of graphitic shale, the usual electrode carbon and a bituminous binder. The outstanding advantage in use of the novel electrodes of the invention is that the shale portion of the electrode will be smelted at the hottest zone in the furnace and reduced to metal.

I claim:

1. A method for producing an alloy which is predominately silicon and aluminum in an electric furnace, said method being characterized by low electrode carbon consumption and comprising smelting a charge consisting essentially of from about 6 to 20 per cent iron oxide by weight, from about 8 to 20 per cent aluminum oxide by weight, silicon oxide and a reducing agent, said charge consisting essentially of graphitic shale and the naturally occurring graphite in the shale serving substantially as the sole reducing agent in the charge.

2. The method as described by claim 1 in which the amount of aluminum oxide in the charge is about 12 per cent by weight.

3. The method as described by claim 2 in which the amount of iron oxide in the charge is about 12 per cent by weight.

4. The method as described by claim 1 in which the temperature of the molten metal in the furnace is not substantially greater than about 1,500° C.

LYALL J. LICHTY.

REFERENCES CITED

The following references are of record in the file of this patent:

UNITED STATES PATENTS

| Number | Name | Date |
|---|---|---|
| 906,339 | Tone | Dec. 8, 1908 |
| 929,518 | Tone | July 27, 1909 |
| 1,014,642 | Debas | Jan. 16, 1912 |
| 1,297,297 | Johnson | Mar. 11, 1919 |
| 2,488,568 | Stripling et al. | Nov. 22, 1949 |